United States Patent
Kato et al.

[11] 4,154,505
[45] May 15, 1979

[54] ELECTRO-OPTICAL LIGHT SHUTTER DEVICE

[75] Inventors: Yasuo Kato, Kodaira; Akio Kumada, Kokubunji, both of Japan

[73] Assignee: Hitachi, Ltd., Japan

[21] Appl. No.: 778,109

[22] Filed: Mar. 16, 1977

[30] Foreign Application Priority Data

Mar. 22, 1976 [JP] Japan .................. 51/29954

[51] Int. Cl.² .................. G02F 1/05
[52] U.S. Cl. .................. 350/150
[58] Field of Search .................. 350/150

[56] References Cited

U.S. PATENT DOCUMENTS

| | | | |
|---|---|---|---|
| 3,823,998 | 7/1974 | Yazaki | 350/150 |
| 3,998,523 | 12/1976 | Otomo | 350/150 |

OTHER PUBLICATIONS

Cutchen et al. "Plzt Electrooptic Shutters; Applications", Applied Optics, vol. 14, 8-1975, pp. 1866-1873.

*Primary Examiner*—John K. Corbin
*Assistant Examiner*—Wm. H. Punter
*Attorney, Agent, or Firm*—Craig and Antonelli

[57] ABSTRACT

In an electro-optical light shutter device using a solid-solution ceramic material for alternate transmission and interception of light, a first voltage is applied to the solid-solution ceramic material in the operating (open) position of the shutter, and a second voltage of polarity opposite to that of the first voltage and having an absolute value smaller than that of the first voltage is applied to the solid-solution ceramic material in the non-operating (closed) position of the shutter. The solid-solution ceramic material has a composition in which a ferroelectric phase and a non-ferroelectric phase adjoin each other through a morphotropic phase boundary.

2 Claims, 6 Drawing Figures

ELECTRO-OPTICAL LIGHT SHUTTER DEVICE

This invention relates to light shutter devices for alternately permitting and inhibiting transmission of light, and more particularly to improvements in a light shutter device utilizing an electro-optical effect.

Optical apparatus including cameras and projectors are provided with a light shutter device (commonly called a shutter, sector, light switch or the like) for controlling intermittent transmission of light. A mechanical light shutter device has heretofore been most widely employed in the art for this purpose. As apparent from its structural principle, the mechanical light shutter device has such a feature that the amount of light transmission (that is, the amount of light leakage) can be limited to a very small value when it is placed in the light intercepting position. Thus, the mechanical light shutter device exhibits such an excellent merit that it provides a very large contrast ratio. (The contrast ratio refers to the ratio between the amount of light transmission in the light transmitting position of the shutter and that in the light intercepting position.) On the other hand, the mechanical light shutter device has various defects including its relatively low operating speed, relatively slow response to the control, difficulty of synchronous operation with other units, and structurally complex and large size, due to the fact that a blade (a light shielding element) having a certain mass is moved to effect transmission and interception of light. Therefore, such mechanical light shutter device is difficult to be applied to an optical apparatus such as a so-called stereoscopic television set in which transmission and interception of light must be controlled at a relatively high speed.

In the case of, for example, the so-called stero-scopic television set above described, light shutters or so-called stereo glasses used therewith are required, among others, to be compact in structure, to operate in exact synchronism with television picture portions displayed alternately on the screen to be viewed by the left and right eyes of a viewer, and to be free from delayed response. However, the aforementioned mechanical light shutter device is difficult to satisfy these requirements.

Attempts for development of high-speed light shutter devices utilizing an electro-optical effect has been made in recent years, and various kinds of electro-optical light shutter devices have been proposed up to data. An example of the proposed devices is an electro-optical light shutter of the kind utilizing the electro-optical "lateral" effect (transverse mode) exhibited by a solid-solution ceramic material. This electro-optical light shutter comprises a thin plate of solid-solution ceramic material, for example, PLZT. A pair of electrodes of conductive material are provided on the plate surface so as to produce the electric field in a direction of plane of the thin plate and the thin plate having such electrodes is disposed between a pair of polarizers. In this electro-optical light shutter, a suitable voltage is applied to the electrodes to produce an electric field in the thin plate of solid-solution ceramic material for imparting the electric field in a direction parallel to the plate surface, and application of such a voltage is subsequently ceased to remove the electric field. That is, the thin plate of solid-solution ceramic material is alternately placed in "one state or operating state in which the electric field is applied thereto" and in "the other state or non-operating state in which the electric field applied thereto is reduced to zero or removed," thereby attaining alternate transmission and intercepting of light. In other words, this electro-optical light shutter utilizes the so-called "lateral" effect among various electro-optical effects exhibited by a solid-solution ceramic material such as PLZT to alternately establish, in the thin plate of solid-solution ceramic material, a "state in which double refraction exists" and a "state in which such double refraction does not exist" depending on whether or not an electric field perpendicular to the advancing direction of light (that is, parallel to the plate surface of the thin plate of solid-solution ceramic material) is applied, thereby controlling alternate transmission and interception of light.

Such an electro-optical light shutter has various excellent advantages, among others, in that it can be constructed into a very compact form, it is satisfactorily responsive to high-speed operation, and it can be easily synchronized with other parts of an optical apparatus using it. However, as far as the electro-optical light shutters developed up to date, including that above described, are concerned, they have such disadvantages that the contrast ratio (which refers to the ratio between the amount of light transmission in the light transmitting position of the shutter and that in the light intercepting position of the shutter) is still less than required, although this contrast ratio is one of the most important characteristics required for a light shutter of this kind, and that the operating voltage requirement is very high or in the order of about 500 to 1,000 volts. For these reasons, the known electro-optical light shutters developed up to date are not always put into practical use.

The inventors have made researches and studies in an effort to find solid-solution ceramic materials suitable for reducing the operating voltage required for an electro-optical light shutter of the kind above described. The results of the researches and studies have clarified that the "state in which double refraction exists" and the "state in which double refraction does not exist" described hereinbefore appear substantially when the phase of a solid-solution ceramic material is ferroelectric (an FE phase) and non-ferroelectric (an NFE phase) respectively. It is therefore preferable to select a solid-solution ceramic material having such a property that the FE phase is induced as a result of polarization due to the application of an electric field, and the original NFE phase is restored as a result of disappearance of polarization due to removal of the electric field. A solid-solution ceramic material having such a property is nothing but one operating with a so-called double hysteresis characteristic as shown in FIG. 1. It will be seen in FIG. 1 that the characteristic curve representing the relation between the degree of polarization (D) and the intensity of electric field (E) observed upon application of an alternating electric field includes a pair of hysteresis loop portions displaced in directions opposite to each other depending on the application of a positive electric field and a negative electric field.

The inventors have further made elaborate investigations in an effort to afford the above characteristic to a solid-solution ceramic material. The results have clarified that a solid-solution ceramic material suitable for this purpose should have a composition in which an FE phase and an NFE phase adjoin each other through a morphotropic phase boundary (MPB), and such a ceramic material is to be operated under such a condition that application of an electric field thereto causes forced transition from the NFE phase to the FE phase. On the basis of the above finding, the inventors have filed Japanese Patent Application No. 60725/74 entiled "ELECTRO-OPTICAL DISPLAY ELEMENT." (For details of the disclosure, reference is to be made to Japanese Laid-open Patent Publication No. 153897/75.)

In the publication, the inventors cite PLZT-7.9/70/30 [an abbreviation of the chemical formula $(Pb_{0.921}La_{0.079})(Zr_{0.70}Ti_{0.30})_{0.98}O_3$] as a practical example of solid-solution ceramic materials capable of operating with a relatively low operating voltage. This ceramic material is preferably employed due to the fact that forced transition from the NFE phase to the FE phase can be caused by application of a relatively low voltage to the material, and the original NFE phase can be restored by merely ceasing the application of the voltage and shorting the electrodes.

Japanese Patent Application No. 60725/74 referred to above describes merely a display element utilizing a light scattering phenomenon due to the "longitudinal" effect among many electro-optical effects exhibited by solid-solution ceramic materials. However, the solid-solution ceramic materials and operating conditions disclosed therein are applicable intact to a light shutter which utilizes the double refraction phenomenon owing to the "lateral" effect.

The inventors made efforts for the application of such a solid-solution ceramic material capable of low voltage operation to a light shutter device. In the experiment, a thin plate of solid-solution ceramic material of composition PLZT-7.9/70/30 was prepared, and after depositing a pair of electrodes on each surface thereof, the thin plate was disposed between a pair of polarizers to constitute a light shutter having a structure as shown in FIG. 2. A predetermined voltage was applied across the electrodes in the operating (open) position of the shutter, and the application of the voltage was ceased in the non-operating (closed) position of the shutter, thereby repeating alternate transmission and interception of light. The results proved that this light shutter manufactured by way of trial was capable of high-speed operation at a low operating voltage in the order of 350 volts, as expected. However, the amount of light leaking in the light intercepting position of this light shutter could not be reduced to an acceptable level, and a satisfactory contrast ratio could not be obtained frequently when the operating temperature was low. At room temperature too, its contrast ratio was still considerably small compared with that of a mechanical shutter, and the value thereof was only about 7 to 10 at the most. With such a small contrast ratio, a conspicuously distinct three-dimensional picture cannot be viewed even when the light shutter is applied to the aforementioned stereoscopic television set.

It is therefore a primary object of the present invention to provide an improved electro-optical light shutter divice which is capable of remarkably increasing the contrast ratio without impairing in any way the aforementioned advantages of the shutter of this kind.

A first important feature of the present invention which attains the above object resides in the fact that, in an electro-optical light shutter device utilizing the "lateral" effect among various electro-optical effects exhibited by a solid-solution ceramic material for carrying out alternate transmission and interception of light (that is, placing the shutter alternately in operating position and non-operating position), a second voltage of polarity opposite to that of a first voltage applied to the solid-solution ceramic material in the operating position of the shutter and having an absolute value smaller than that of the first voltage is applied to the solid-solution ceramic material in the non-operating position of the shutter. A second important feature of the present invention resides in the fact that the solid-solution ceramic material has such a composition that a ferroelectric phase (an FE phase) and a non-ferroelectric phase (an NFE phase) adjoin each other through a morphotropic phase boundary (MPB). The electro-optical light shutter device of the present invention having the features above described can operate with a low operating voltage, provides a large contrast ratio, and is suitable for high-speed operation.

Other objects, features and advantages of the present invention will become more apparent from the following detailed description of a preferred embodiment thereof taken in conjunction with the accompanying drawings, in which.

Figure 1:
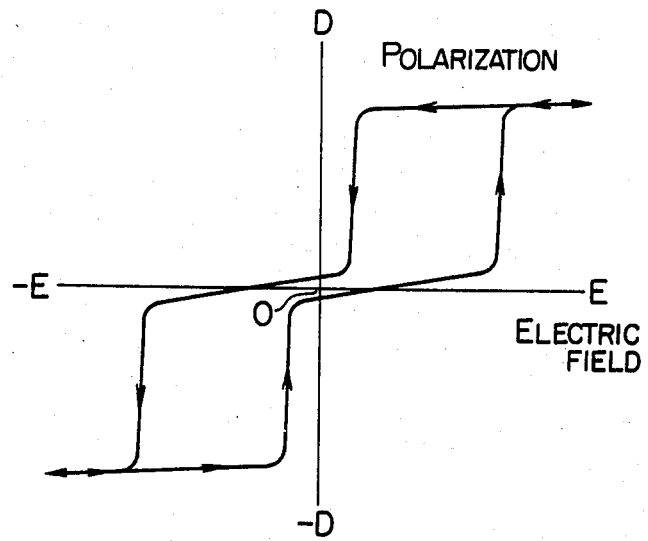
FIG. 1 is a graphic representation of the relation between the degree of polarization (D) and the intensity of electric field (E) observed on a solid-solution ceramic material preferably employed in the present invention.
Figure 2:
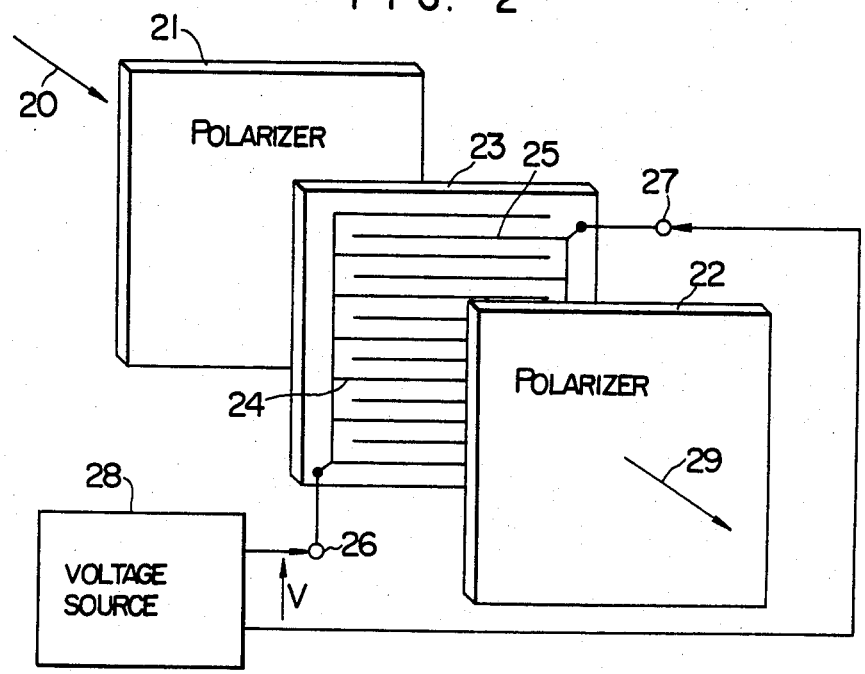
FIG. 2 shows diagrammatically the structure of a preferred embodiment of the electro-optical light shutter device according to the present invention.

FIG. 2 shows diagrammatically the structure of a preferred embodiment of the electro-optical light shutter device according to the present invention. Referring to FIG. 2, this light shutter device comprises a pair of polarizers 21 and 22, and a thin plate 23 of solid-solution ceramic material disposed therebetween. The shutter device is of the type in which an electric field applied to the thin plate 25 of solid-solution ceramic material is varied to cause rotation of the plane of polarization of light passed through the first polarizer 21, thereby controlling the amount of light passing through the second polarizer 22.

Figure 5:
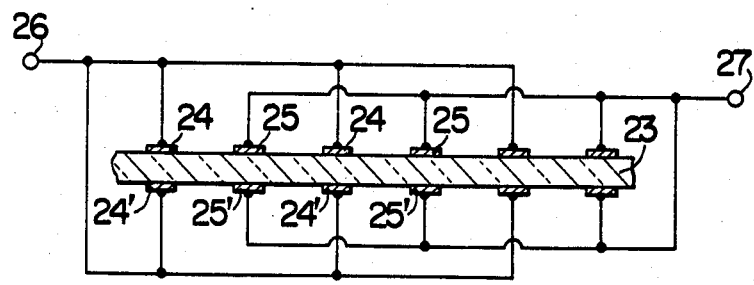
FIG. 5 shows, by way of example, a preferred arrangement of electrodes in the electro-optical light shutter device according to the present invention.

In the embodiment of the present invention shown in FIG. 2, the planes of polarization of the polarizers 21 and 22 are perpendicular to each other. A pair of comb-shaped electrodes 24 and 25 of conductive material are provided on one of the surfaces of the thin plate 23 of solid-solution ceramic material in such a relation that the corresponding teeth of the electrodes 24 and 25 oppose each other in a plane parallel to the plate surface. In the present embodiment, another pair of comb-shaped electrodes 24' and 25' entirely similar to the electrodes 24 and 25 are provided on the other surface of the thin plate 23 of solid-solution ceramic material, as shown in detail in FIG. 5. However, these electrodes 24' and 25' may not be provided on the other surface of the plate 23. The electrodes 24 and 24' are connected to a terminal 26, while the electrodes 25 and 25' are connected to another terminal 27. A source of drive voltage 28 is connected across these terminals 26 and 27. The voltage source 28 applies a voltage V across the terminals 26 and 27 connected to the electrodes 24, 24' and 25, 25' respectively so that an electric field is produced in the thin plate 23 of solid-solution ceramic material in a direction parallel to the plate surface.

The solid-solution ceramic material used for forming the thin plate 23 has such a composition and temperature characteristic that a ferroelectric phase (an FE phase) and a non-ferroelectric phase (an NFE phase) adjoin each other through a morphotropic phase boundary (MPB), and forced transition from the NFE phase to the FE phase can take place in response to the application of a predetermined lateral electric field to the material under a suitable temperature condition, as described hereinbefore. One example of such material is PLZT-7.9/70/30, as also described hereinbefore.

In response to the application of the voltage V of suitable value across the terminals 26 and 27 in the shutter device having the aforementioned structure, an electro-optical "lateral" effect is produced in the thin plate 23 of solid-solution ceramic material, and this effect acts to rotate the plane of polarization of that portion of incident light 20 passed through the first polarizer 21. Due to the fact that the plane of polarization of the second polarizer 22 is perpendicular to that of the first polarizer 21, the amount of light 29 passing through (emerging from) the second polarizer 22 is minimum and maximum when the angle of rotation is 0° and 90° respectively. Therefore, alternate interception and transmission of light (that is, the function of a light shutter) can be carried out by varying the applied voltage between two suitable values thereby switching over the angle of rotation between 0° and 90°.

Figure 3:
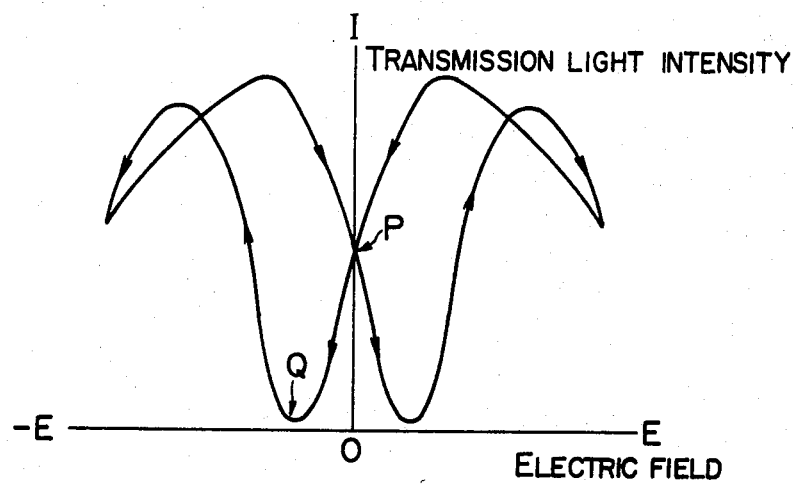
FIG. 3 is a graphic representation of the relation between the transmission light intensity (I) and electric field (E) in the electro-optical light shutter device according to the present invention.

The aforementioned solid-solution ceramic material PLZT-7.9/70/30 was used to form the thin plate 23, and the voltage V applied across the terminals 26 and 27 was varied in alternating fashion, in the structure shown in FIG. 2, to find the relation between the intensity (I) of light 29 passing through (emerging from) the second polarizer 22 and the intensity of electric field E produced in the thin plate 23 of solid-solution ceramic material. The result provided an I-E characteristic as shown in FIG. 3. It will be apparent from FIG. 3 that a considerably large amount of light as shown by a point P passes through the second polarizer 22 in the non-operating (closed) position of the shutter, even when a predetermined voltage is applied to the thin plate 23 of solid-solution ceramic material in the operating (open) position of the shutter, and then this applied voltage is reduced to zero in the non-operating (closed) position of the shutter. This means that leakage of a considerably large amount of light occurs in the non-operating (closed) position of the shutter. Such a phenomenon results from the fact that mere reduction of the applied voltage to the zero level in the non-operating (closed) position of the shutter is not effective in completely eliminating the polarization existing still in the solid-solution ceramic material. The inventors have found that the amount of light transmission (that is, light leakage) in the non-operating (closed) position of the shutter can be reduced to a very small value as shown by the point Q in FIG. 3 when a voltage of polarity opposite to that of the voltage applied in the operating (open) position of the shutter and having an absolute value smaller than that is applied to the thin plate 23 of solid-solution ceramic material in the non-operating (closed) position of the shutter. Such an effect can be obtained due to the fact that application of a voltage of opposite polarity to the thin plate 23 of solid-solution ceramic material acts to promote complete elimination of the polarization remaining still in the solid-solution ceramic material. Experiments have proved that the level (the absolute value) of the voltage of opposite polarity applied in the non-operating (closed) position of the shutter is most preferably 10 to 20% of the level (the absolute value) of the voltage applied in the operating (open position of the shutter, in order to minimize the amount of light leakage in the non-operating (closed) position of the shutter thereby improving the contrast ratio.

The purpose of application of the voltage of opposite polarity in the non-operating (closed) position of the shutter is to completely eliminate the polarization remaining still in the solid-solution ceramic material. Therefore, such a voltage of opposite polarity need not necessarily be continuously applied throughout the period in which the shutter is kept in the non-operating (closed) position, and a voltage of opposite polarity having a suitable level may be applied during part of the above period or preferably during part of the initial stage of the above period. In other words, a voltage of opposite polarity having a suitable level sufficient to completely eliminate the polarization remaining still in the solid-solution ceramic material may merely be applied, and after successful elimination of the polarization, the applied voltage may be reduced to the zero level.

Figure 4:
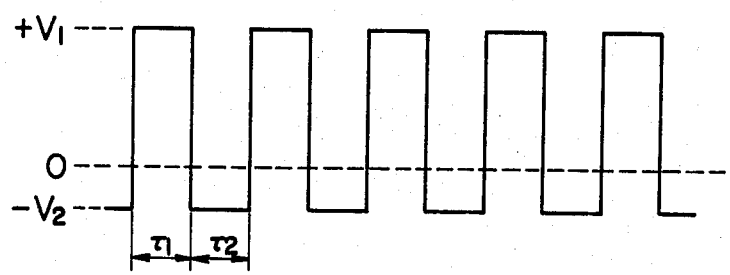
FIG. 4 shows the waveform of a voltage used for driving the electro-optical light shutter device according to the present invention.

The present invention is based on the finding above described and is featured by the fact that the voltage V applied from the voltage source 28 across the terminals 26 and 27 is varied in a manner as shown in FIG. 4. Referring to FIG. 4, a voltage $+V_1$ most suitable for the shutter operation is applied across the terminals 26 and 27 during the operating (open) period $\tau_1$ of the shutter, and a voltage $-V_2$ ($|V_2|<|V_1|$) is applied across the terminals 26 and 27 during the non-operating (closed) period $\tau_2$ of the shutter. The ratio $|V_2|/|V_1|$ between these voltages $-V_2$ and $+V_1$ is desirably 0.1 to 0.2 as above described. When the voltage applied to the thin plate 23 of solid-solution ceramic material is varied in this manner, light passed through the first polarizer 21 during the operating (open) period $\tau_1$ of the shutter is rotated in its plane of polarization exactly 90° in the thin plate 23 of solid-solution ceramic material before passing through the second polarizer 22, but light passed through the first polarizer 21 during the non-operating (closed) period $\tau_2$ of the shutter is not rotated in its plane of polarization at all. As a result, the intensity of light passing through (leaking from) the second polarizer 22 is reduced to a minimum in the non-operating (closed) position of the shutter.

In a practical device used for experimental purpose, PLZT-7.9/70/30 was employed to provide the thin plate 23 of solid-solution ceramic material, and the opposite teeth of the comb-shaped electrodes 24 and 25 were spaced apart by a distance of 0.7 mm. With this experimental device, it was found that the most suitable value of voltage $+V_1$ required to be applied during the operating (open) period $\tau_1$ was $+350$ volts, and that of voltage $-V_2$ applied during the non-operating (closed) period $\tau_2$ was $-35$ volts. The contrast ratio (the ratio between the amount of light transmission during the operating period $\tau_1$ and the amount of light transmission during the non-operating period $\tau_2$) was 28 to 37 in this case. In contradistinction, the contrast ratio was only 7 to 10 when the voltage of $+350$ volts was applied during the operating (open) period $\tau_1$ and this applied voltage was reduced to the zero level during the non-operating (closed) period $\tau_2$ according to conventional practice.

According to the present invention described hereinbefore, a second voltage of polarity opposite to that of a first voltage applied during the operating (open) period of the shutter and having an absolute value smaller than (preferably about 10 to 20% of) that of the first voltage is applied to the thin plate of solid-solution ceramic material during the non-operating (closed) period of the shutter. Application of such a second voltage is remarkably effective in that the intensity of light leakage during the non-operating (closed) period of the shutter can be reduced to about ¼ of that in the prior art case in which such voltage is decreased to the zero level during the non-operating (closed) period of the shutter. Consequently, a contrast ratio as large as about four times that of the prior art value can be obtained. The application of the second voltage of opposite polarity during the non-operating (closed) period of the shutter is further effective in accelerating disappearance of the polarization remaining still in the thin plate of solid-solution ceramic material, thereby permitting early transition of the shutter from the operating position to the non-operating position and improving the response characteristic of the shutter. Therefore, the present invention provides a highly useful electro-optical light shutter device which operates with a low voltage, provides a large contrast ratio, and is suitable for high-speed operation.

As a practical application, the inventors have succeeded in realization of a so-called stereo-scopic television set. In this television set, a pair of stereo glasses each including the light shutter device of the aforementioned structure are used to view television picture portions alternately displayed for the left and right eyes on the screen of a single cathode-ray tube, so that the viewer can view a three-dimensional or stereo picture on the screen. More precisely, television picture portions to be viewed by the left and right eyes of the viewer are displayed alternately on the screen of the single cathode-ray tube at intervals of one field of a televised scene, that is, at time intervals of 17 msec. When the picture portion to be viewed by the left eye of the viewer is displayed on the screen of the cathode-ray tube, the light shutter in the stereo glass for the left eye is opened while closing the light shutter in the stereo glass for the right eye in synchronism with the alternate display, while when the picture portion to be viewed by the right eye of the viewer is displayed on the screen of the cathode-ray tube, the light shutter in the stereo-glass for the right eye is opened while closing the light shutter in the stereo glass for the left eye, so that the viewer can view a three-dimensional or stereo-scopic television picture on the screen by the afterimage effect of his eyes. In the prior art electro-optical light shutter device, the amount of light leakage in the non-operating (closed) position of the shutter is considerably large as described hereinbefore. Thus, application of stereo glasses using such prior art shutters to the stereo picture viewing purpose is encountered with such a problem that the picture portions displayed alternately to be viewed by the left and right eyes of the viewer will be sensed also by the right and left eyes respectively of the viewer, resulting in impossibility of viewing a sufficiently distinct stereo picture. In contradistinction, the amount of light leakage in the non-operating (closed) position of the shutter is very small in the case of the electro-optical light shutter device according to the present invention. Therefore, a conspicuously distinct stereo picture can be viewed on the screen with the stereo glasses using the shutter of the present invention without being hardly affected by the intermixing of the picture portions encountered with the stereo glasses using the prior art shutter.

Figure 6:
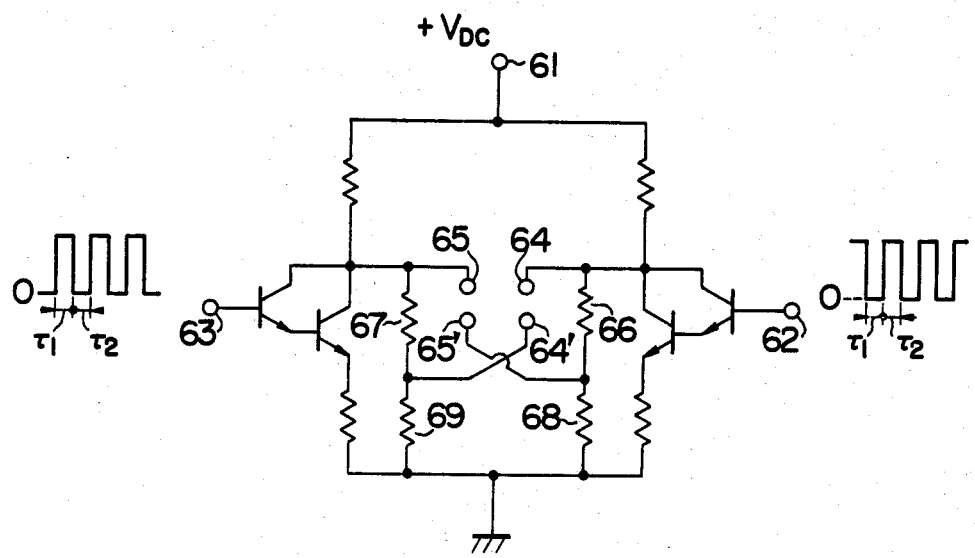
FIG. 6 is a circuit diagram of a preferred form of a drive voltage source employed in the electro-optical light shutter device according to the present invention.

FIG. 6 shows one form of practical circuit arrangement of the voltage source 28 in the electro-optical light shutter device according to the present invention. The circuit shown in FIG. 6 is constructed so that it can also supply necessary voltage to the light shutters used as the aforementioned pair of left and right stereo glasses for viewing a stereo-scopic television picture. Referring to FIG. 6, a DC voltage $+V_{DC}$ is externally supplied to a terminal 61, and trigger pulses of relatively inverted phase are respectively applied to a pair of input terminals 62 and 63 for controlling the shutter open-close timing. These trigger pulses have a rectangular waveform for controlling the shutter operation during the open and closed periods of the shutter. An output voltage having a waveform as shown in FIG. 4 appears across a pair of output terminals 64 and 64', and another output voltage inverted exactly in phase appears across another pair of output terminals 65 and 65'. Therefore, when one of the optical shutters is connected across the output terminals 64, 64', and the other optical shutter is connected across the output terminals 65, 65', these two optical shutters are alternately opened and closed. The voltage $+V_1$ applied during the operating (open) period $\tau_1$ in the output voltage waveform shown in FIG. 4 is determined by the DC voltage $+V_{DC}$ supplied to the terminal 61, while the voltage $-V_2$ applied during the non-operating (closed) period $\tau_2$ is determined by the ratio between the resistance values of resistors 67 and 69. The negative output voltage $-V_2$ appearing across the output terminals 65 and 65' is determined by the ratio between the resistance values of resistors 66 and 68. The contrast ratio provided by these two light shutters is greater than 30, when the ratio between the resistance values of each of the resistor combinations is selected to be 10:1 to 10:3. When the above resistance ratio is excessively large, the absolute value $|V_2|$ of the voltage $-V_2$ applied during the non-operatng (closed) period $\tau_2$ of the shutter becomes too small to attain the desired reduction in the amount of light leakage. Conversely, when the above resistance ratio is excessively small, the desired reduction in the intensity of light leakage cannot be similarly attained. Therefore, the ratio between the resistance values should be suitably determined within the specified range taking into account the factors including the composition and operating temperature of the solid-solution ceramic material.

The aforementioned embodiment of the present invention has specifically referred to the relatively perpendicular polarization plane arrangement of the polarizers 21 and 22. However, it can be easily understood that the light shutter device can equally effectively operate even when the plane of polarization of the second polarizer 22 is arranged to be parallel to that of the first polarizer 21. In such a case, the shutter device permits transmission of light (that is, the shutter is opened) in the non-operating position of the shutter, while the shutter device intercepts light (that is, the shutter is closed) in the operating position of the shutter. Thus, the transmission light intensity is increased in the non-operating position of the shutter (that is, the shutter open position) to contribute to the improvement in the contrast ratio according to the present invention.

In the aforementioned specific embodiment of the present invention, PLZT-7.9/70/30 has been referred to as a solid-solution ceramic material suitable for use, by way of example. Various other solid-solution ceramic materials of different compositions can also be used provided that they have an NFE phase adjoining an FE phase through a morphotropic phase boundary. For example, excellent effects similar to those above described can be obtained with the use of $(Pb_{0.914}La_{0.086})(Zr_{0.65}Ti_{0.35})_{0.98}O_3$ [abbreviated commonly as PLZT-8.6/65/35], $(Pb_{0.9775}La_{0.0225})(Zr_{0.915}Ti_{0.085})_{0.994}O_3$ [abbreviated commonly as PLZT-2.25/91.5/8.5], $(Pb_{0.918}La_{0.082})(Zr_{0.70}Ti_{0.30})_{0.98}O_3$ [abbreviated commonly as PLZT-8.2/70/30], $Pb_{0.98}(Zr_{0.60}Sn_{0.33}Ti_{0.07})Nb_{0.02}O_3$, $(Pb_{0.90}Ba_{0.07}Sr_{0.03})(Zr_{0.90}Ti_{0.10})O_3$, etc. For further details of solid-solution ceramic materials suitable for use in the shutter device of the present invention, reference is to be made to aforementioned Japanese Laid-open Patent Publication No. 153897/75.

It will be understood from the foregoing detailed description that an electro-optical light shutter device providing a large contrast ratio and operable with a low operating voltage can be realized by the present invention, and it can be remarkably effectively applied to all kinds of optical apparatus in which repeated transmission and interception of light at a relatively high speed is required.

What we claim is:

1. An electro-optical light shutter device comprising a pair of polarizers, a thin plate of solid-solution ceramic material disposed between said polarizers, a pair of electrodes provided on at least one of the surfaces of said thin plate of solid-solution ceramic material so as to produce an electric field in a direction parallel to the plane of said thin plate, said solid-solution ceramic material having a non-ferroelectric phase adjoining to a ferroelectric phase through a morphotropic phase boundary so that application of an electric field to said ceramic material causes forced transition between the non-ferroelectric phase and the ferroelectric phase, and voltage source means for applying a first voltage having a voltage value required for shutter operation in the operating position of the shutter and a second voltage of polarity opposite to that of said first voltage and having an absolute value smaller than that of said first voltage in the non-operating position of the shutter to reduce transmission light intensity of the shutter device to a level less than the zero voltage level to provide a high contrast ratio between the operation position and the non-operating position of the shutter.

2. An electro-optical light shutter device as claimed in claim 1, wherein the ratio between the absolute value of said second voltage and that of said first voltage is selected to be 0.1 to 0.2.

* * * * *